April 7, 1925.  1,532,136
E. L. GRAF
METHOD AND STRUCTURE FOR ANALYTICAL MEASURING OF WEIGHTS
Filed Nov. 3, 1921
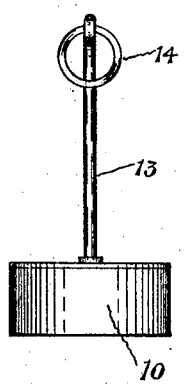
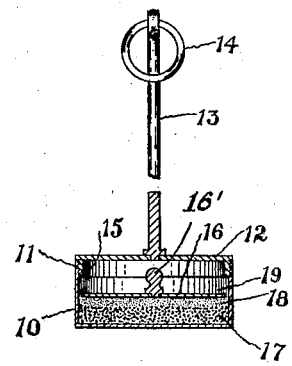
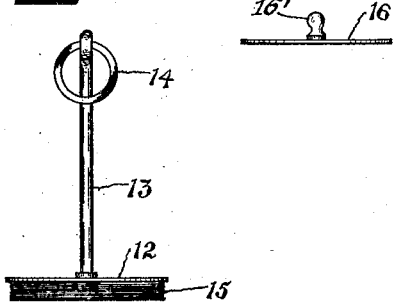
Witnesses:
Inventor:
Ernest L. Graf, Patented Apr. 7, 1925.

1,532,136

UNITED STATES PATENT OFFICE.

ERNEST L. GRAF, OF NEW YORK, N. Y.

METHOD AND STRUCTURE FOR ANALYTICAL MEASURING OF WEIGHTS.

Application filed November 3, 1921. Serial No. 512,512.

*To all whom it may concern:*

Be it known that I, ERNEST L. GRAF, a subject of the King of Italy, residing in New York, county and State of New York, have invented certain new and useful Improvements in Methods and Structures for Analytical Measuring of Weights, of which the following is a specification.

The present invention relates to balance-weights or counter-poises, and particularly to balance-weights or counter-poises for analytical measuring in association with precision weighing machines, that is, scales for measuring such as one milligram, etc., and smaller fractional weights, and one object is to provide a counter-weight or counter-poise which may be sold as a separate article from the weighing machine, and which is caused to function by the co-operation of the user in adding weight to the normally empty body of the counter-weight or counter-poise until the precision weight limit or counterbalancing weight limit is attained, the added weight not being predetermined in amount.

Another object is to provide for use in analytical chemistry where fractions of grams, milligrams etc., are involved, a counter-weight which in effect is a standard counter-weight or counter-poise. Thus in view of the fact that in one establishment conducting such work it perhaps would be required to have a counter-weight capable of weighing one ounce plus one one-hundredth of a milligram, while in another such establishment the standard weight might be one ounce plus three one-hundredths of a milligram, and it is substantially impossible to make up a counter-weight the standard for which varies in each establishment, but by my device these difficulties are obviated.

Another object is to provide a counter-weight or counter-poise whereby the tare of the container or receptacle which receives the material to be weighed need not be calculated or considered; thus such container or receptacle may be placed upon the scale and perfect counterbalance of the container or receptacle and my counter-poise may be obtained by the scales, the material then being placed in the container or receptacle and weighed by the scales in the usual manner, it not being necessary that the weight of either the container or receptacle or the counter-poise shown be known. Furthermore, my counter-weight or counter-poise being adapted for continuous use, it thus becomes a convenient standard counter-poise for all similar containers or receptacles.

I attain these objects, and such other objects as are disclosed in the following description, by the counter-weight or counter-poise, one embodiment of which is shown by way of example in the accompanying drawing which forms part of this specification, and in which Figure 1, is a front elevation of the counter-weight or counter-poise.

Figure 2, is a front elevation thereof, partly in vertical section.

Figure 3, is a vertical sectional view showing details of the interior of the body or receptacle portion thereof.

Figure 4, is an edge view of the inner lid or partitioning member used with said body or receptacle portion.

Figure 5, is a front elevation of the outer lid or cover and its stem or handle.

Similar numerals refer to similar parts throughout the several views.

The counter-weight or counter-poise, all parts of which are of light metallic material, preferably aluminum, comprises the cylindrical shell or body portion 10, having the interior annular thread 11 at its upper edge; the outer lid or disk-cover 12, with stem 13 having the attaching ring 14, and having the exteriorly threaded dependent annular extension 15 which is receivable in the body or receptacle portion 10, the exterior thread of the extension 15 being engageable with the threaded interior of the body or receptacle portion 10; and the inner lid or partitioning member 16 which fits loosely but snugly in the body or receptacle portion 10, and has thereon the manipulating member or knob 16'.

The empty body or receptacle portion 10 is filled to within, say 80% of the required special weight with a dense pulverized material, preferably metallic, as indicated by 17 in Fig. 2, having a high specific gravity, one such suitable material being powdered metallic lead. Ten to twelve per cent of the remainder of the required weight may be acquired by the addition to the heavy specific powder in the body or receptacle position 10 of a lighter specific powder analogous to the first material, such as powdered metallic aluminum, indicated by 18 in Fig. 2, having a proportionally increased bulk or volume over the first mentioned material. The remainder of the required weight is definitely approached to precise limits by the introduction into the body or receptacle 10, preferably above the inner lid or partitioning member 16, of still lighter pulverized material, as indicated by 19 in Fig. 2, of lower specific gravity than either of the before mentioned materials, so that the approach of the counter-weight or counter-poise to the required counter-balancing weight or limit is extremely gradually attained by reason of the larger volume of the last noted material that is added to the two other materials.

As may be readily understood from the foregoing description and the drawing, instead of introducing three powdered elements into the body or receptacle portion 10 for acquiring the precise or counter-balancing weight, a metallic base powder of heavy specific gravity may be introduced for the major portion of the weight, and a second powder of very much lighter specific gravity and greatly increased bulk or volume may be added, whereby the limit of precision may be gradually approached and acquired by the use of the second element.

Or the outer lid or cover 12 may be constructed to provide the major portion of the weight; or the casing or body or receptacle portion 10 may be constructed to provide the major portion of the weight; in either case a lighter powder or powders of large bulk or volume being introduced for approaching and acquiring the precise weight.

Or the counter-balance or counter-poise being constructed as shown, a single element of requisite weight and volumetric displacement for gradually approaching or acquiring by accumulated portions thereof the precise weight may be employed.

Instead of introducing powdered materials such as mentioned into the body or receptacle portion 10, some forms of fluid materials may be utilized, such as mercury (quick silver) for the base material, say 85% of the weight to be acquired, 10% or 12% of the further weight being acquired by the addition of a fluid material such as glycerine, which is substantially non-volatile under the same conditions as mercury. The remaining bulk of fluid material for acquiring the weight may be had by putting into the body or receptacle portion 10 some bulking fluid material of lighter specific weight than the two previously mentioned fluids to permit of the gradual approach or final adjustment to give an exactly but indeterminate required weight to the counter-balance or counter-poise.

Or the counter-balance or counter-poise may be made by the utilization of the fluid having the metal contents first hereinbefore mentioned suspended therein.

Or by the mixing of various components such as first hereinbefore mentioned and melting the same down to a single combination or alloy, thereby providing a mass necessary to give the precise counter-balancing weight to the counter-balance or counter-poise, for thereby providing fixed or permanent counter-balances or counter-poises particularly available for counterbalancing all specific containers of the same weight.

The above described method for making a counter-balance or counter-poise by approach to a desired fractional proportion of any standard weight permits of the larger proportion of the weight being immediately fixed or established by the use of a material having small volume but great weight, and approach to the limits and acquirement of the desired weight by the utilization of other material of like nature having large volume or bulk with small amount of weight.

In use, as may be readily understood, the counter-balance or counter-poise is hung, as by the hook 14, upon the balance-beam of the weighing machine, not shown, in opposed weight relation to the container, not shown, perfect balancing of the counter-balance or counter-poise and container being approached and attained as hereinbefore described, the weight of material introduced into the container then being readily ascertainable by means of the weighing machine.

Having thus described my invention, it should be understood that there may be modifications thereof and variations thereon without departing from the spirit of the invention or exceeding the scope of the appended claims.

What I claim and desire to protect by Letters Patent is:—

1. In a counter-poise, the combination of, a body portion providing an interior chamber; a cover for said chamber removably secured to the body portion and adapted to provide tightness for preventing chemical changes in said chamber; and a partitioning member manually removably insertible in said chamber and manually slidably movable therein.

2. In a counter-poise, the combination of, a body portion of low specific gravity and providing an interior chamber; a cover of low specific gravity for said chamber removably secured to the body portion and adapted to provide tightness for preventing chemical changes in said chamber; and a partitioning member of low specific gravity manually removably insertible in said chamber and manually slidably movable therein.

3. In a counter-poise, the combination of, a body portion of low specific gravity and providing an interior chamber; a cover of low specific gravity for said chamber removably secured to the body portion and adapted to provide tightness for preventing chemical changes in said chamber; and a partitioning member of low specific gravity manually removably insertible in said chamber and manually slidably movable therein and having means for manipulating said member.

4. In a counter-poise, the combination of, a cylindrical open topped body portion of low specific gravity and providing an interior chamber threaded on its side; a circular cover for the body portion of material of low specific gravity having a threaded transverse flange portion for engaging the threaded sides of said chamber; and a flat circular partitioning member of material of low specific gravity and manually removably insertible in said chamber and manually slidably movable therein and having means for manipulating said member.

5. In a counter-poise, the combination of, a cylindrical open topped body portion of material of low specific gravity and providing an interior chamber threaded on its sides; a circular cover for the body portion of material of low specific gravity having a threaded transverse flange for engaging the threaded sides of said chamber and having means for suspension on its top; and a flat circular partitioning member of material of low specific gravity and manually removably insertible in said chamber and manually slidably movable therein and having means for manipulating said member.

6. In a counter-poise separable from the weighing means, the combination of, a body portion of low specific gravity and providing an interior chamber; a cover of low specific gravity for said chamber removably secured to the body portion and adapted to provide tightness for preventing chemical changes in said chamber; and a partitioning member manually removably insertible in said chamber and movable therein and having means for manipulating said member.

7. In a counter-poise separable from the weighing means, the combination of, a body portion of low specific gravity and providing an interior chamber; and a cover of low specific gravity for said chamber removably secured to the body portion and adapted to provide tightness for preventing chemical changes in said chamber and provided with means for suspending the counterpoise when the cover is in closing position.

8. In a counter-poise separable from the weighing means, the combination of, a body portion of low specific gravity and providing an interior chamber; a cover of low specific gravity for said chamber removably secured to the body portion and provided with means for suspending the counter-poise when the cover is in closing position; and a partitioning member of low specific gravity manually removably insertible in said chamber and manually movable therein.

9. In a counter-poise separable from the weighing means, the combination of, a body portion of low specific gravity and providing an interior chamber; a cover of low specific gravity for said chamber removably secured to the body portion and provided with means for suspending the counter-poise when the cover is in closing position; and a partitioning member of low specific gravity manually removably insertible in said chamber and movable therein and provided with projecting means for manipulating said member.

10. In a counter-poise separable from the weighing means, the combination of, a body portion providing an interior chamber; a cover for said chamber removably secured to the body portion; a partitioning member manually removably insertible in said chamber and manually movable therein; and comminuted material arranged in said chamber and separated into portions by said partitioning member for providing additional weight to the counter-poise.

11. In a counter-poise separable from the weighing means, the combination of, a body portion providing an interior chamber; a cover for said chamber removably secured to the body portion; a partitioning member manually removably insertible in said chamber and manually movable therein; comminuted material of high specific gravity arranged in said chamber; and comminuted material arranged in said chamber and of lower specific gravity than the first material, the comminuted materials being separated by said partitioning member; the material of high specific gravity being arranged below said member and the material of lower specific gravity being arranged above said member.

12. In a counter-poise separable from the weighing means, the combination of, a body portion providing an interior chamber; a cover for said chamber removably secured to the body portion; a partitioning member manually removably insertible in said chamber and manually movable therein; comminuted material of high specific gravity arranged in said chamber; comminuted material arranged in said chamber and of lower specific gravity than the first material; and comminuted material arranged in said chamber and of lower specific gravity than the second material; the first material being arranged in said chamber below the second material and both said materials being below said partitioning member; the third material being arranged in said chamber above said partitioning member.

13. In a counter-poise, a container; a removable cover for the container; a layer of material of high specific gravity arranged in the container for adding weight to the container and cover; a second layer of material of lower specific gravity than the first layer arranged in the container for adding further weight for approaching precise counter-balancing weight for the counter-poise; and a third layer of material of lower specific gravity than the second layer arranged in the container for adding still further weight for attaining precise counter-balancing weight.

14. In a counter-poise, a container; a removable cover for the container; a layer of pulverized material of high specific gravity arranged in the container for adding weight to the container and cover; a second layer of pulverized material of lower specific gravity than the first layer arranged in the container for adding further weight for approaching precise counter-balancing weight for the counter-poise; and a third layer of pulverized material of lower specific gravity than the second layer arranged in the container for adding still further weight for attaining precise counter-balancing weight.

15. In a counter-poise, a container; a removable outer cover for the container; a removable inner cover for the container constituting means for separating the interior of the container into two parts; a layer of pulverized material of high specific gravity arranged in the container for adding weight to the container and covers; a second layer of pulverized material of lower specific gravity than the first layer arranged in the container for adding further weight for approaching precise counter-balancing weight for the counter-poise; and a third layer of pulverized material of lower specific gravity than the second layer arranged in the container for adding still further weight for attaining precise counter-balancing weight; the first and second layers being arranged below said inner cover and the third layer being arranged thereabove.

ERNEST L. GRAF.

Witnesses:
CHAS. S. WILLIAMS.
H. D. PENNEY.